May 5, 1931. H. L. MILLER 1,803,435
HEAT EXCHANGE APPARATUS
Filed Oct. 29, 1930 2 Sheets-Sheet 1
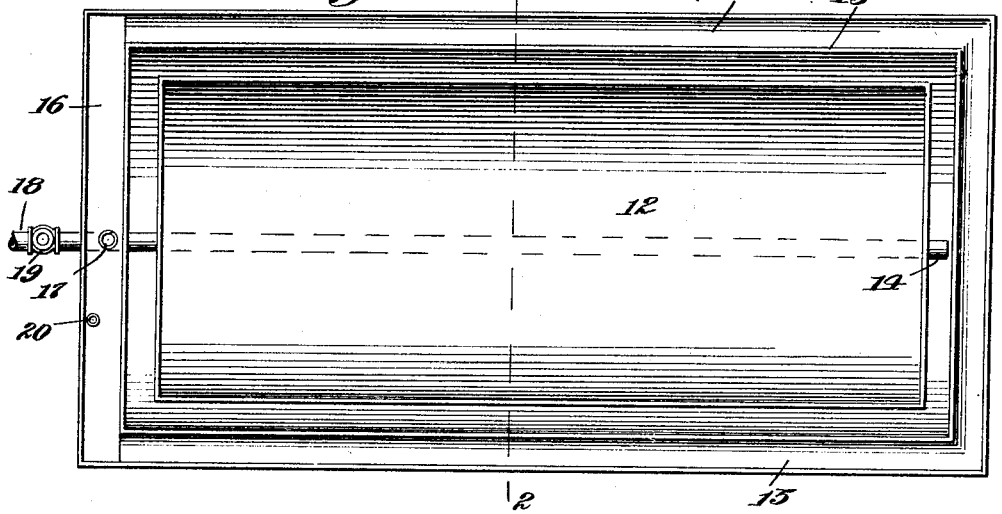
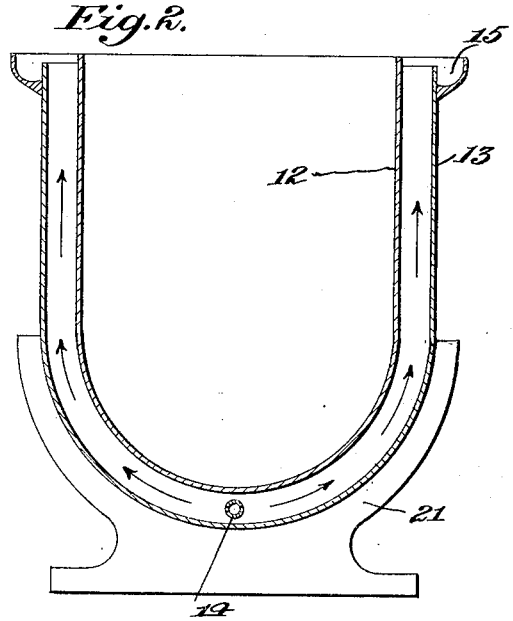
Inventor:
Harry L. Miller,
by Calvert & Calvert
Att'ys.

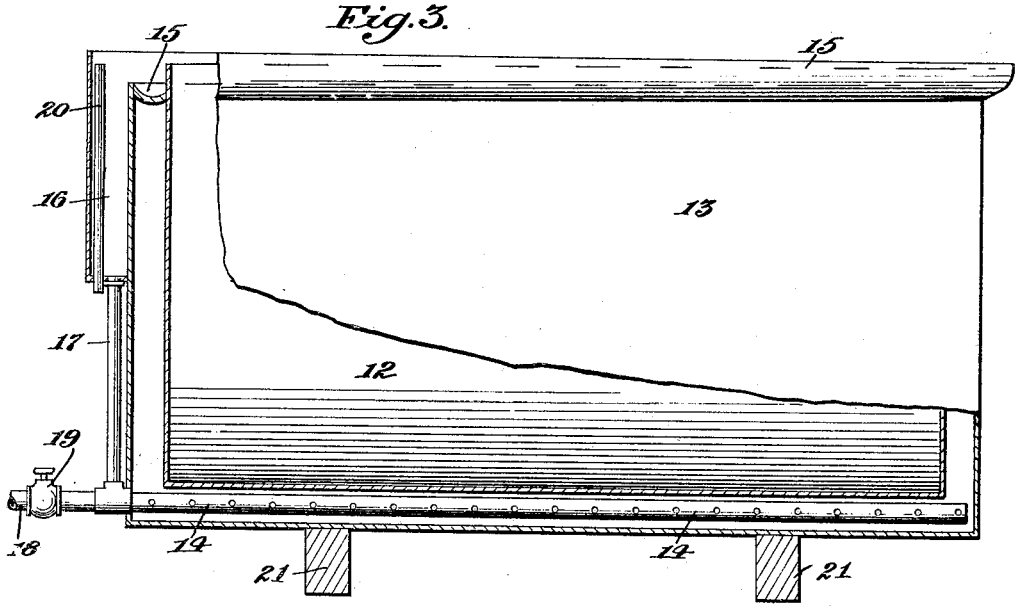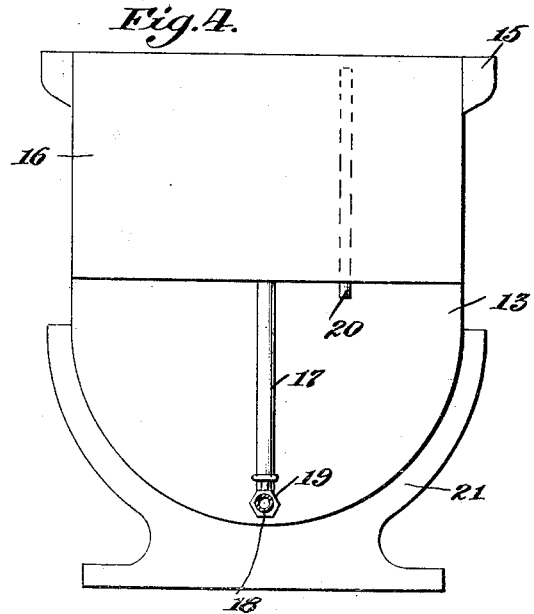

Patented May 5, 1931

1,803,435

UNITED STATES PATENT OFFICE

HARRY L. MILLER, OF CHESTER, PENNSYLVANIA

HEAT-EXCHANGE APPARATUS

Application filed October 29, 1930. Serial No. 492,057.

This invention relates to a heat exchange apparatus for liquids primarily intended for heating milk in pasteurizing the same, but which may also be utilized for cooling liquids. In some pasteurizing apparatus now in use more or less difficulty has been encountered in that the milk is not heated as rapidly as is desirable. Also as the heating liquid has been applied near the tops of the pasteurizing vats, where the milk being heated is the hottest, and where there is more or less foam when the milk is being stirred, some of the foam or milk is splashed against the hot tops of the vats and a so-called "burning-on" of the milk along the tops of the vats has resulted. The present invention has for its object to obviate this last-named objection by feeding the heating liquid at the bottom of the liquor-containing vat, where the milk is the coolest, the heating liquid then passing upward from the bottom to the top of the vat and being received in an inclined overflow trough by which it is discharged into a receiving tank and is then returned to the feeding-in pipe. Also by applying the heating liquid where the milk is the coolest a more rapid heating of the milk is effected than when the heating liquid is applied where the milk is hottest.

In the accompanying drawings Fig. 1 is a plan view of an apparatus embodying the present invention. Fig. 2 is a section of the same on line 2—2, Fig. 1. Fig. 3 is a broken outside view of the improved vat, and Fig. 4 is an end view of the same looking from the left of Fig. 3.

Referring to the drawings, 12 denotes a liquid-receiving vat and 13 a jacket surrounding the same. At the bottom of the vat 12, and in the space between the same and its jacket 13, is arranged a perforated feed pipe 14, the perforations in said pipe being largely at the sides thereof so that the heating liquid flowing from said pipe will pass upward between the vat and its jacket as indicated by the arrows in Fig. 2. Surrounding the top of the vat and its jacket is a trough 15 which is inclined downward toward a tank 16 located at one end of the vat, said tank having a discharge pipe 17 communicating with the feed pipe 14.

In the use of the improved apparatus for heating a liquid, as in pasteurizing milk, a steam inlet pipe 18, communicating with the feed pipe 14, will be provided; said steam inlet pipe being furnished with a valve 19 for regulating the discharge of steam into the feed pipe 14. The tank 16 is preferably provided with an overflow drip pipe 20 which will enable the increase of volume of the heating liquid, due to condensation of the steam, to be discharged.

The operation of the invention will be readily understood from the foregoing. The steam pressure in the feed pipe 14 will cause a rapid circulation of the heating liquid in the space between the liquid-containing vat 12 and its jacket 13, and the liquid passing upward in the said space will overflow into the inclined trough 15 and will thus be discharged into the tank 16 and then be returned to the feed pipe 17. Thus a rapid circulation of the heating liquid will be ensured in the space between the vat 12 and its jacket 13, and as the heating liquid enters the said space beneath the vat 12 where it is hottest, and at a point where the liquid to be heated is the coolest, it will be understood that the invention will avoid the difficulty hereinbefore referred to, and will also ensure a rapid heating operation.

If the apparatus is to be used for cooling liquids it will be understood that a cold liquid will be forced into the feed pipe 14 through the pipe connection 18, instead of using said pipe connection as a steam inlet.

The apparatus will, in practice, preferably be mounted on supports 21.

If the apparatus is to be used as a pasteurizing device it may be provided with a suitable cover and be equipped with suitable stirring mechanism, but as these features form no part of the present invention it is not necessary that they should be shown or described.

Having thus described my invention I claim and desire to secure by Letters Patent:

1. A heat exchange apparatus for liquids comprising a vat for holding the liquid to be heated or cooled, a jacket spaced apart from and surrounding said vat, a perforated feed pipe located at the bottom of said vat in the space between the vat and its jacket, a slanting trough at the top of said vat and into which the up-flowing heating or cooling liquid discharges by overflow, a tank at one end of said vat and into which the said trough discharges, and a down-flow pipe connecting said tank with said perforated feed pipe.

2. A heat exchange apparatus for liquids comprising a vat for holding the liquid to be heated, a jacket spaced apart from and surrounding said vat, a perforated feed pipe located at the bottom of said vat in the space between the vat and its jacket, a slanting trough at the top of said vat and into which the up-flowing heating liquid discharges by overflow, a tank at one end of said vat and into which the said trough discharges, a down-flow pipe connecting said tank with said perforated feed pipe, and a steam inlet connection with said perforated feed pipe.

In testimony whereof I affix my signature.

HARRY L. MILLER.